May 24, 1932.  F. AESCHBACH  1,859,690

KNEADING AND MIXING MACHINE, PARTICULARLY FOR PRODUCING CONFECTIONERY

Filed Dec. 16, 1930  2 Sheets-Sheet 1

INVENTOR:
Friedrich Aeschbach
By Henry Orth Jr.
atty.

May 24, 1932. F. AESCHBACH 1,859,690
KNEADING AND MIXING MACHINE, PARTICULARLY FOR PRODUCING CONFECTIONERY
Filed Dec. 16, 1930 2 Sheets-Sheet 2

INVENTOR:
Friedrich Aeschbach
By Henry Orth Jr
atty

Patented May 24, 1932

1,859,690

UNITED STATES PATENT OFFICE

FRIEDRICH AESCHBACH, OF AARAU, SWITZERLAND

KNEADING AND MIXING MACHINE, PARTICULARLY FOR PRODUCING CONFECTIONERY

Application filed December 16, 1930, Serial No. 502,828, and in Switzerland November 21, 1930.

This invention relates to kneading and mixing machines, particularly for producing confectionery, comprising a central vertical shaft and at least one tool spindle obliquely disposed to said shaft and moving orbitally round the same. As these machines are used for different purposes, such as kneading and stirring of dough, beating the white of eggs, and cream, milk and the like it is necessary to provide for driving the tools at very different speeds depending on the purpose they are to serve.

According to the invention provision is made in the machine for this requirement by intercalating between the driving shaft and said driven shaft a planet wheel change speed gear, comprising an interiorly toothed rim and an exteriorly toothed rim, the driving shaft of said gear, which is constituted by the central vertical shaft, being secured to the mounting for the orbitally moving shaft and the planet wheels cooperating therewith, and by providing two braking appliances, the one of which cooperating with said interiorly toothed rim and the other with said exteriorly toothed rim, and an operative connection between the braking appliances, suchwise, that when the one braking appliance is operative the other is released and vice versa.

Suitably out of the obliquely disposed spindle a further vertical spindle is arranged to perform an orbital movement round the central vertical shaft.

To enable further variation of the ratio of gearing between the tool spindles and the shaft of the motor, suitably, the driving shaft of the planet wheel change speed gear is arranged to act as the driven shaft of a second planet wheel change speed gear the latter being intercalated between the motor and the first planet wheel change speed gear, whereby the motor shaft and the driven shaft are coaxially disposed.

In the accompanying drawings a constructional form of a kneading and mixing machine according to this invention and comprisig two orbitally moving spindles is illustrated, in which Fig. 1 is a vertical section of the drive for the different shafts including the two superimposed planet wheel change speed gears;

Figure 2:
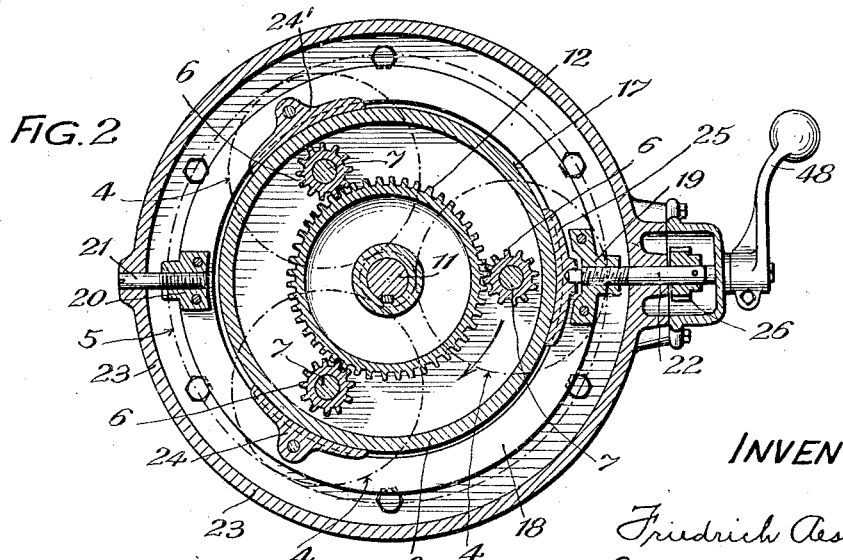
Fig. 2 is a section on the line II—II in Fig. 1.

On the driving shaft 1 of the motor 2, a pinion 3 is keyed with which the toothed circumference 4 of each of the three planet wheels of that gear is in mesh which hereinafter will be referred to as the second planet wheel change speed gear. Besides, the toothed circumference 4 cooperates with the interiorly toothed rim of the drum 5. The toothed circumference 4 is firmly connected to a further toothed circumference 6 of the planet wheel and the two toothed portions 4 and 6 that differ in diameter are coaxially disposed and rotatably mounted on a supporting pin 7 which is supported at both of its ends by the drum 8 and the disk 9 respectively. The drum 8 is formed with an extended hub 8' which is rotatably mounted at its upper end in a ball bearing 10 and at its lower end on the central driven shaft 11. To the shaft 11 a gear wheel 12 is fixed which constitutes the exteriorly toothed rim of that gear with which operates the toothed portions 6 of the three planet wheels, as shown in Fig. 2. The drum 5 with the interiorly toothed rim is rotatably mounted by means of its hub 13 on a sleeve 14 on the cover 15 of the casing and formed with a cylindrical surface 16 for cooperation with a brake. A similarly constructed brake cooperates with the cylindrical surface 17 on the drum 8. Each of these two braking appliances is provided with two rings 18, made of flat steel, the interior diameter of which being somewhat larger than the cylindrical surfaces 17 and 16 respectively. The rings 18 are interconnected in pairs by two diametrically opposed connecting members 19, 20 for each pair and the latter supported from the casing 23 to be displaced along the common axis of pins 21, 22 and 29 threadedly connected to the members 19, 20 respectively.

Figure 1:
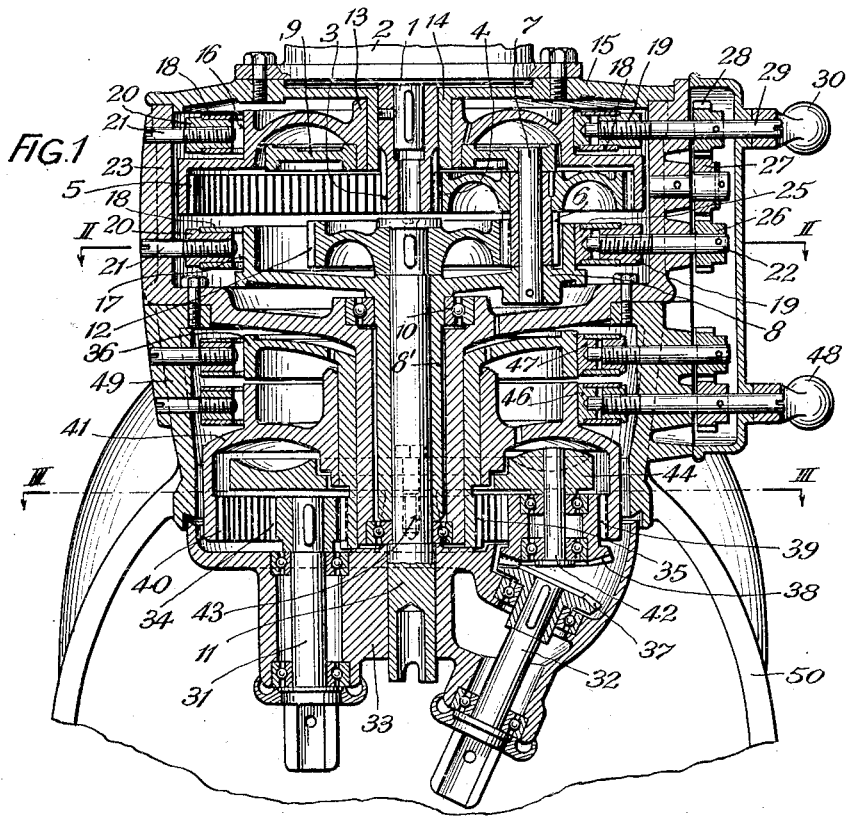

Between each pair of rings 18 three brake blocks 24, 24' and 25 are mounted. The brake block 25 is acted upon by the pin 22, suchwise, that by turning the pin 22, whereby the latter is screwed into the connecting member 19, the brake block 25 is pressed against the cylindrical surface 17, and, consequently, the rings 18 are shifted to the right in Fig. 1 and thus also the brake blocks 24 and 24' are pressed against the cylindrical surface 17 and the drum 8 positively braked. When the pin 22 is turned in the opposite direction all the three brake blocks are lifted off the cylindrical surface 17 and the drum 8 released. On the pin 22 a pinion 26 is secured which meshes with a pinion 27 which in turn engages in a pinion 28 secured to the pin 29 which corresponds as to position and functioning to the pin 22 of the braking appliance of the drum 8, so as to actuate in similar manner the braking appliance of the drum 5 on the cylindrical surface 16. The pin 29 is provided with a hand crank 30 and as the threads of the two pins 22 and 29 are of opposite hands the turning of the crank 30 in the one direction has the effect that the pin 29 is screwed into the corresponding connecting member and the correlated brake applied, whereas the pin 22 is screwed backwards in its appropriated connecting member and the corresponding brake released. When the crank 30 is turned in the other direction the brake correlated to the pin 29 is released and the one associated with the pin 22 is applied.

On positively braking the drum 5 the planet wheels perform a true rocking movement on the interiorly toothed circumference of the drum 5 and rotate at high speed, so that by means of the pinion 6 the gear wheel 12 and the central shaft 11 together with it are also turned at high speed. On braking the drum 8 so as to arrest the same the planet wheels are held from orbital movement, so that an ordinary gear with two pairs of gear wheels 3, 4 and 6, 12 between the motor driven shaft 1 and the shaft 11 is provided. Therefore, a regulation for varying the speed free of shoe between the motor driven shaft 1 and the central shaft 11 in wide limits is obtained by controlling a single hand crank.

Figure 3:
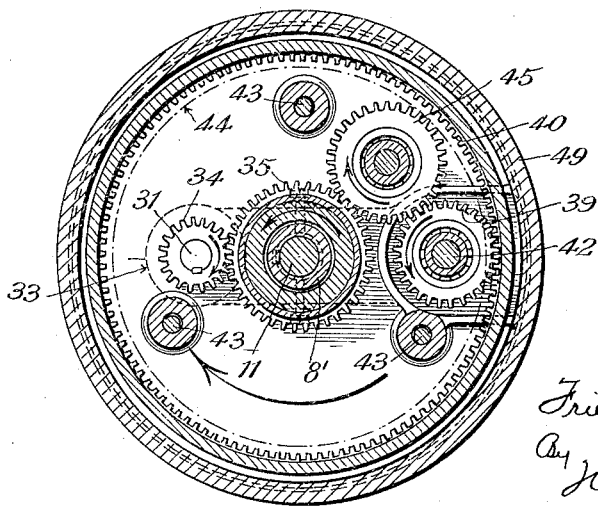
Fig. 3 is a section on the line III—III in Fig. 1.

For effecting the orbital movement as well as the individual rotational movement of the spindle 31, extending parallel to the shaft 11, and the corresponding movements of the inclined spindle 32 respectively the shaft 11 constitutes the driving shaft of a first planet wheel change speed gear situated below the above described gear of this kind. To the shaft 11 the bearing support 33 is keyed in which the spindles 31 and 32 are mounted. On the spindle 31 a pinion 34 is carried which functions as a planet wheel for cooperation with a toothed rim 35 exteriorly of the rotatable drum 36, whereas to the spindle 32 a bevel gear wheel 37 is keyed which meshes with a bevel wheel 38. The hub of the bevel wheel 38 carries a toothed portion 39 which cooperates as a planet wheel with the interiorly toothed portion 40 of the drum 41 which constitutes the interiorly toothed rim of the first gear. The bevel wheel 38 is rotatable on a pin 42 which is supported by a disk 44 fixed to the support 33 by screws 43 (Fig. 3). A further spur gear wheel 45 is provided (Fig. 3) which engages in the toothed portions 39 and 35. Thus the toothed portion 39 represents again the planet wheel which cooperates with the interiorly toothed rim 40 and the exteriorly toothed rim 35 via 45. To this first planet wheel gear also two braking appliances are correlated the one appliance 46 cooperating with the drum 41 and the other, 47, with the drum 36. These braking appliances are of similar construction as those of the above described second gear and are controlled from a crank 48, whereby in turning the crank in the one or other direction the one of the brakes is applied and the other released.

When the drum 36 and consequently also the toothed rim 35 are totally braked the pinion 34 on rotation of the bearing support 33 performs a true rocking motion on said toothed rim and the spindle 31, besides describing an orbital path round the shaft 11, rotates at great speed about its own axis. The inclined spindle 32 is also turned about its own axis by the wheel 45 carrying out a true rocking motion on the toothed rim 35, thus permitting of connecting a tool to either of the two spindles.

When the drum 41 is braked to come to standstill the toothed rim 39 performs a true rocking movement on the interiorly toothed rim 40 thus causing the spindle 32 to rotate at greater speed about its own axis than in the previously described case and at the same time the toothed rim 35 and, consequently, also the shaft 31 are driven by means of the wheel 45, whereby the speed of said shaft is also greater than in the former case.

In as much as the second planet wheel change speed gear permits of varying the number of revolutions of the shaft 11 driven thereby within wide limits the application of the first planet wheel drive is apt to increase the speed range of the spindles 31 and 32 considerably more.

Figure 4:
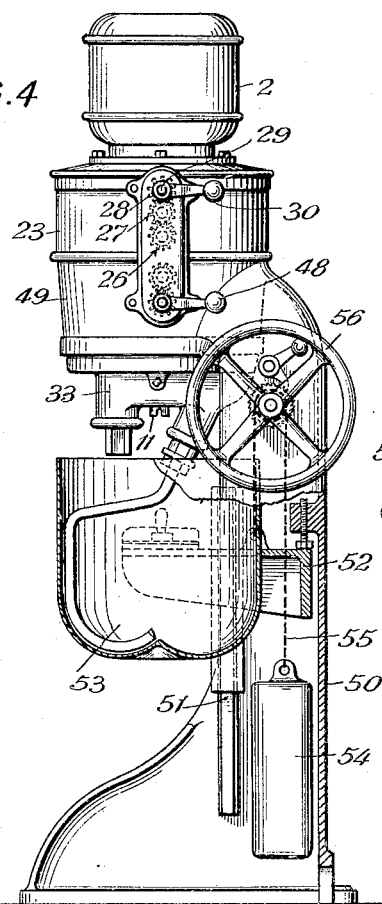
Figs. 4 and 5 show a side and a front view respectively of the kneading and mixing machine.
Figure 5:
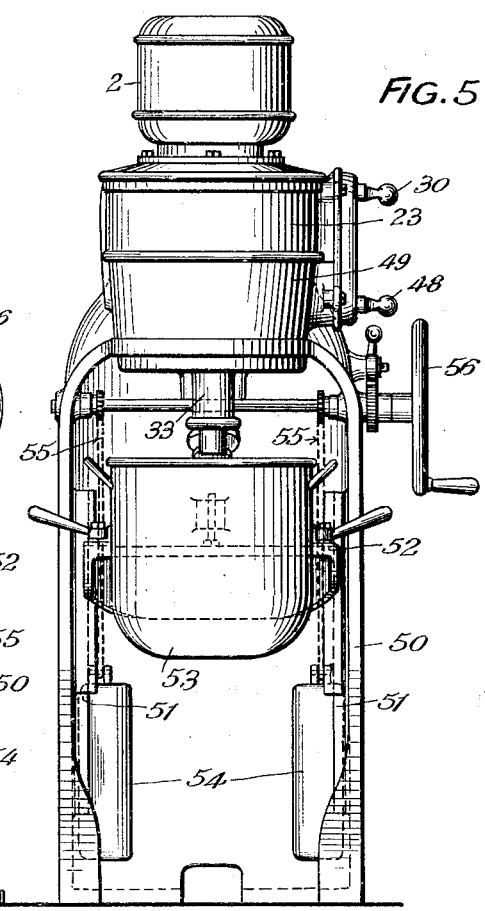

The first planet wheel drive is accommodated in a housing 23 rigidly connected to the casing 49 which may be made in one with the frame 50 of the kneading and mixing machine. As shown in Figs. 4 and 5 the frame 50 is provided with guides 51 along which a table 52 is displaceable in the vertical direction on which the trough 53 is dismountably secured. The table 52 is moved upwardly by action of counterweights 54 hanging on tension members 55 and is adapted to be displaced by means of a hand wheel 56 when it is desired to empty the trough.

Alternatively the vertical orbitally moving spindle 31 may be omitted and the machine provided with a central vertical shaft and an inclined spindle only with the latter carrying out an orbital movement round the central shaft.

I claim:

1. In a kneading and mixing machine, particularly for producing confectionery, in combination, a central vertical driving shaft, at least one tool spindle orbitally moving round said driving shaft, a planet wheel change speed gear controlling the speed of the said tool spindle, an interiorly and an exteriorly toothed rim provided in said gear, a bearing support connected to said driving shaft and in which said orbitally moving spindle carrying planet wheels fixed thereto are rotatably mounted, two braking appliances cooperating with said interiorly toothed rim and said exteriorly toothed rim respectively, and means for simultaneously actuating said braking appliances to effect change in speed.

2. In a kneading and mixing machine, particularly for producing confectionery, in combination, a central vertical driving shaft, a vertical tool spindle, an oblique tool spindle, said tool spindles performing an orbital movement round said driving shaft, a planet wheel change speed gear controlling the speed of the said tool spindles, an interiorly and an exteriorly toothed rim provided in said gear, a bearing support connected to said driving shaft and in which said orbitally moving spindles carrying planet wheels fixed thereto are rotatably mounted, two braking appliances cooperating with said interiorly toothed rim and said exteriorly toothed rim respectively, and means for simultaneously actuating said braking appliances to effect change in speed.

3. In a kneading and mixing machine, particularly for producing confectionery, in combination, a central vertical driving shaft, a vertical tool spindle, an oblique tool spindle, said tool spindles performing an orbital movement round said driving shaft, a planet wheel change speed gear controlling the speed of the said tool spindles, an interiorly and an exteriorly toothed rim provided in said gear, a pinion provided on said vertical tool spindle adapted to cooperate as a planet wheel for said spindle with said exteriorly toothed rim, a planet wheel for the oblique spindle engaging in said interiorly toothed rim, a pair of bevel wheels interposed between said oblique spindle and said planet wheel for the same, a transmission wheel engaging in said planet wheel for said oblique spindle and said exteriorly toothed rim, a bearing support connected to said driving shaft and in which said orbitally moving spindles carrying planet wheels fixed thereto are rotatably mounted, two braking appliances cooperating with said interiorly toothed rim and said exteriorly toothed rim respectively, and means for simultaneously actuating said braking appliances to effect change in speed.

4. In a kneading and mixing machine, particularly for producing confectionery, in combination, a central vertical driving shaft, at least one tool spindle orbitally moving round said shaft, a planet wheel change speed gear controlling the speed of the said tool spindle, a motor driven shaft coaxially disposed with said driving shaft, a second planet wheel change speed gear interposed between said motor driven shaft and said driving shaft, an interiorly and an exteriorly toothed rim provided in said first-mentioned planet wheel change speed gear, a bearing support connected to said driving shaft and in which said orbitally moving spindle carrying planet wheels fixed thereto are rotatably mounted, two braking appliances cooperating with said interiorly toothed rim and said exteriorly toothed rim respectively, and means for simultaneously actuating said braking appliances to effect change in speed.

5. In a kneading and mixing machine, particularly for producing confectionery, in combination, a central vertical driving shaft, at least one tool spindle orbitally moving round said shaft, a planet wheel change speed gear controlling the speed of the said tool spindle, a motor driven shaft, coaxially disposed with said driving shaft, a second planet wheel change speed gear interposed between said motor driven shaft and said driving shaft, an interiorly and an exteriorly toothed rim provided in each of said gears, a bearing support connected to said driving shaft and in which said orbitally moving spindle carrying planet wheels fixed thereto are rotatably mounted, two braking appliances for said first gear cooperating with the interiorly toothed rim and the exteriorly toothed rim thereof respectively, two braking appliances for said second gear cooperating with the interiorly toothed rim thereof and said bearing support, respectively, and means provided for each gear for simultaneously actuating the braking appliances thereof to effect change in speed.

6. In a kneading and mixing machine, particularly for producing confectionery, in combination, a central vertical driving shaft, at least one tool spindle orbitally moving round said shaft, a planet wheel change speed gear controlling the speed of the said tool spindle, a motor driven shaft coaxially disposed with said driving shaft, a second planet wheel change speed gear interposed between said motor driven shaft and said driving shaft, a common casing for said first gear and said second gear, an interiorly and an exteriorly toothed rim provided in each of said gears, a bearing support connected to said driving shaft and in which said orbitally moving spindle carrying planet wheels fixed thereto are rotatably mounted, two braking appliances for said first gear cooperating with the interiorly toothed rim and the exteriorly toothed rim thereof respectively, two braking appliances for said second gear cooperating with the interiorly toothed rim thereof and said bearing support respectively, and means provided for each gear for simultaneously actuating the braking appliances thereof to effect change in speed.

In testimony whereof I have signed my name to this specification.

FRIEDRICH AESCHBACH.